United States Patent
Dominique et al.

[11] Patent Number: 6,158,763
[45] Date of Patent: Dec. 12, 2000

[54] AIRBAG ASSEMBLY CONCEALED WITHIN AN INSTRUMENT PANEL

[75] Inventors: Alexander L. Dominique, Rochester Hills; D. Scott Bittinger, Fenton; Issa A. Nasser, Oakland Township; Patrick J. Gibbons, Royal Oak, all of Mich.

[73] Assignee: Chrysler Corporation, Auburn Hills, Mich.

[21] Appl. No.: 09/208,201
[22] Filed: Dec. 9, 1998
[51] Int. Cl.$^7$ ................................................. B60R 21/16
[52] U.S. Cl. ........................ 280/728.2; 280/728.3; 280/730.1; 280/752
[58] Field of Search .................. 280/728.3, 732, 280/752, 728.2, 730.1

[56] References Cited

U.S. PATENT DOCUMENTS

| | | | |
|---|---|---|---|
| 3,778,085 | 12/1973 | Lipkin | 280/150 |
| 4,842,300 | 6/1989 | Ziomek et al. | 280/732 |
| 5,013,065 | 5/1991 | Kreuzer | 280/743 |
| 5,069,480 | 12/1991 | Good | 280/743 |
| 5,135,253 | 8/1992 | Hirashima et al. | 280/732 |
| 5,211,421 | 5/1993 | Catron et al. | 280/728.2 |
| 5,242,192 | 9/1993 | Prescaro et al. | 280/730 |
| 5,342,087 | 8/1994 | Oda | 280/728 |
| 5,375,876 | 12/1994 | Bauer et al. | 280/728 |
| 5,378,014 | 1/1995 | Cooper et al. | 280/728 |
| 5,407,225 | 4/1995 | Cooper | 280/728 |
| 5,447,329 | 9/1995 | Hamada | 280/728.1 |
| 5,451,075 | 9/1995 | Parker et al. | 280/728.3 |
| 5,582,424 | 12/1996 | Okuyama et al. | 280/728.3 |
| 5,588,674 | 12/1996 | Yoshimura et al. | 280/732 |
| 5,613,704 | 3/1997 | White, Jr. et al. | 280/740 |
| 5,630,614 | 5/1997 | Conlee et al. | 280/730.1 |
| 5,647,608 | 7/1997 | Damman et al. | 280/728.2 |
| 5,863,062 | 1/1999 | Harada et al. | 280/728.3 |
| 5,961,142 | 10/1999 | Shiraki et al. | 280/728.3 |

*Primary Examiner*—Lanna Mai
*Assistant Examiner*—Lynda Jasmin
*Attorney, Agent, or Firm*—Lawrence J. Shurupoff

[57] ABSTRACT

An automotive safety airbag installation includes a padded instrument panel having a U-shaped tearable seam in the panel skin, and a concealed airbag assembly having two hinged lids spaced from the instrument panel internal surface, such that during inflation of the airbag the lids swing outwardly to cause a flap-like section of the panel to deflect upwardly for expansion of the airbag into the passenger compartment. One of the lids closes a gap between the airbag and instrument panel to guide the airbag through the instrument panel and to protect both the airbag and the instrument panel from damage. The padded instrument panel is designed to achieve good shock absorbing action when struck by a human body, in the absence of airbag deployment.

3 Claims, 4 Drawing Sheets

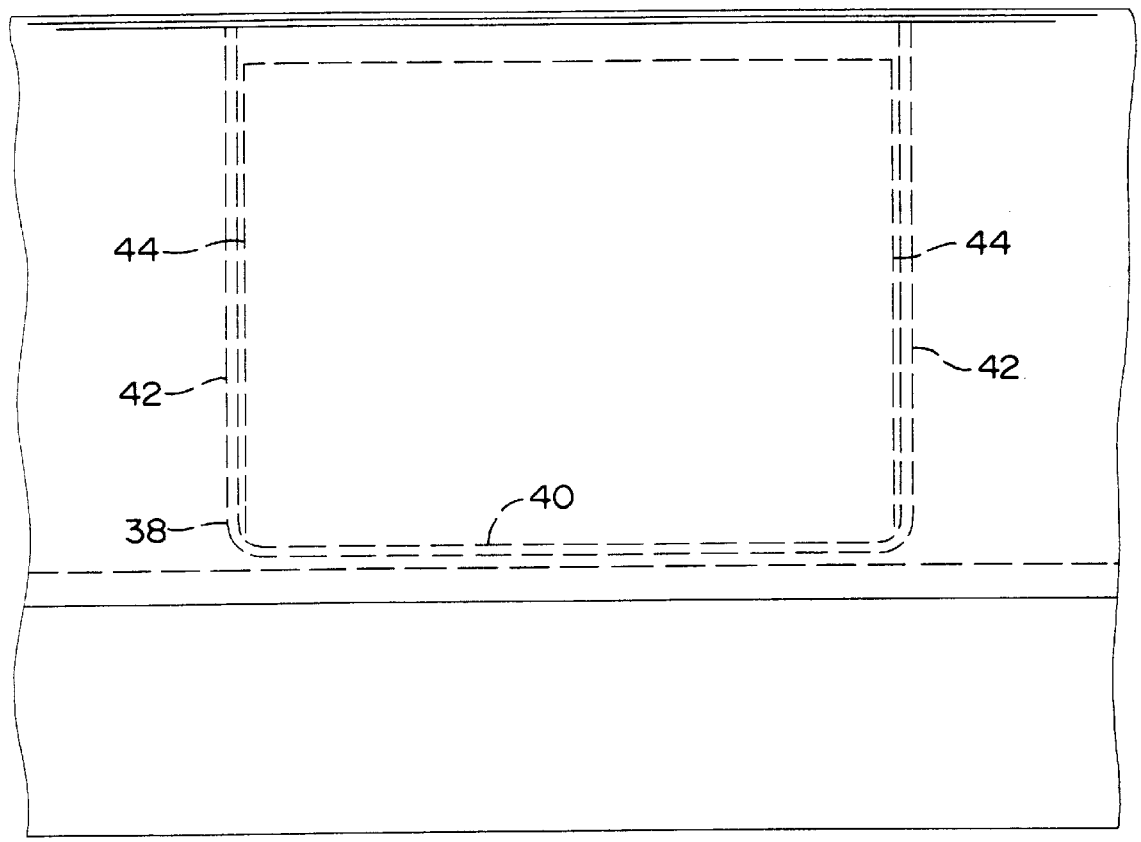
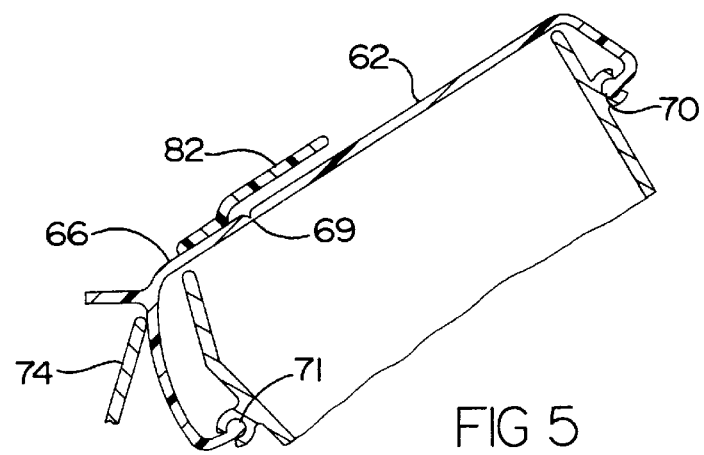

AIRBAG ASSEMBLY CONCEALED WITHIN AN INSTRUMENT PANEL

BACKGROUND OF THE INVENTION

1. Field of the Invention

This invention relates to automotive safety airbags, and particularly to a safety air bag assembly concealed within, or behind, a padded instrument panel. The padded instrument panel is designed to provide a relatively soft cushioned surface capable of absorbing shock forces in low level crash situations of a lesser magnitude than that required to cause deployment of the airbag. Should a person strike their head or upper body on the padded instrument panel without deployment of the airbag, the cushioned panel will absorb the impact energy so as to minimize human injury or trauma.

2. Description of Prior Developments

It is known that passenger safety airbags can be deployed behind padded instrument panels. However, in many cases the airbag assembly is mounted or constructed in such a way that the instrument panel has to be rigidified or internally reinforced, thereby lessening the cushioning effect of the panel padding should the passenger forcibly strike the panel.

U.S. Pat. No. 5,378,014, issued to Robert Cooper, shows a padded instrument panel overlying a normally concealed airbag assembly. The outer skin of the panel has an H-shaped notch designed to sever portions of the panel into two hinged doors when the airbag is deployed. The panel has internal stabilizing ribs for reinforcing the panel against cracking.

U.S. Pat. No. 5,451,075, issued to Thomas Parker et al, shows a cushioned instrument panel that includes two rigid hinged doors seated against a folded airbag. The rigid doors reinforce the cushioned panel, and thereby reducing the cushioning action in a low shock event.

U.S. Pat. No. 5,456,487, issued to Fred Daris et al, shows an airbag assembly located behind a cushioned instrument panel, such that in a crash situation the expanding airbag forcibly impacts two hinged pads that are relatively thick and rigid. These rigid pads lessen the cushioning action of the instrument panel in situations where a person might strike the panel without deployment of the airbag.

SUMMARY OF THE INVENTION

The present invention relates to a safety airbag installation that includes an airbag assembly located behind an instrument panel in an automotive vehicle, such that the airbag assembly is spaced from the panel, and the panel is adapted to act as a safety cushion when the airbag is in an inactive non-deployed condition.

The instrument panel includes an outer skin, an inner flexible wall, and a foam core sandwiched between the skin and flexible wall. The skin is formed with a U-shaped notch that defines a tearable seam in the panel.

The airbag assembly includes an airbag canister having an airbag exit mouth registering with the surface of the instrument panel circumscribed by the U-shaped notch. During deployment of the airbag, hinged closures on the mouth of the canister forcibly impact the flexible wall that forms an inner surface of the instrument panel. The flexible wall is driven outwardly to open the U-shaped seam in the panel skin, thereby enabling the expanding airbag to expand through the opening in the panel into the passenger compartment.

One feature of the invention is the U-shaped notch in the outer skin of the instrument panel. When the seam is severed a single upwardly-moving flap is formed in the panel. The single flap is inherently stronger than the dual flaps used in the prior art arrangements, in that the central portion of the flap is continuous, i.e. devoid of notches or seams. In the non-deployed state of the airbag, the single flap has sufficient strength that the flap can have a desired cushioning action should a passenger in the vehicle forcibly impact the flap area (without deployment of the airbag).

A further feature of the invention is that the hinged closures on the exit mouth of the airbag canister are spaced from the inner surface of the instrument panel. The closures therefore do not rigidify the cushioned instrument panel, or otherwise interfere with the desired cushioning action when the airbag is in the non-deployed state. When deployed, the lower hinged closure overlies and spans a gap between the instrument panel and the airbag canister to protect the lower edge of the airbag opening on the instrument panel from the force of the airbag.

In preferred practice of the invention the instrument panel has a horizontal reinforcement structure located slightly below the U-shaped notch in the panel skin. The closure on the canister exit mouth includes a lower hinged lid that has sufficient length to span the space between the canister mouth and the instrument panel reinforcement when the airbag is deployed. The lower lid prevents undesired expansion of the expanding airbag into the space behind the instrument panel.

Further features and advantages of the invention will be apparent from the attached drawings and description of an illustrative embodiment of the invention.

BRIEF DESCRIPTION OF THE DRAWINGS

FIG. 4 is an elevational view of the FIG. 1 airbag installation, taken in the direction of arrow 4 in FIG. 1.

FIG. 5 is a fragmentary sectional view taken in the same direction as FIGS. 1 and 3, but illustrating a variant of the FIG. 3 construction.

DESCRIPTION OF A PREFERRED EMBODIMENT OF THE INVENTION

Figure 1:
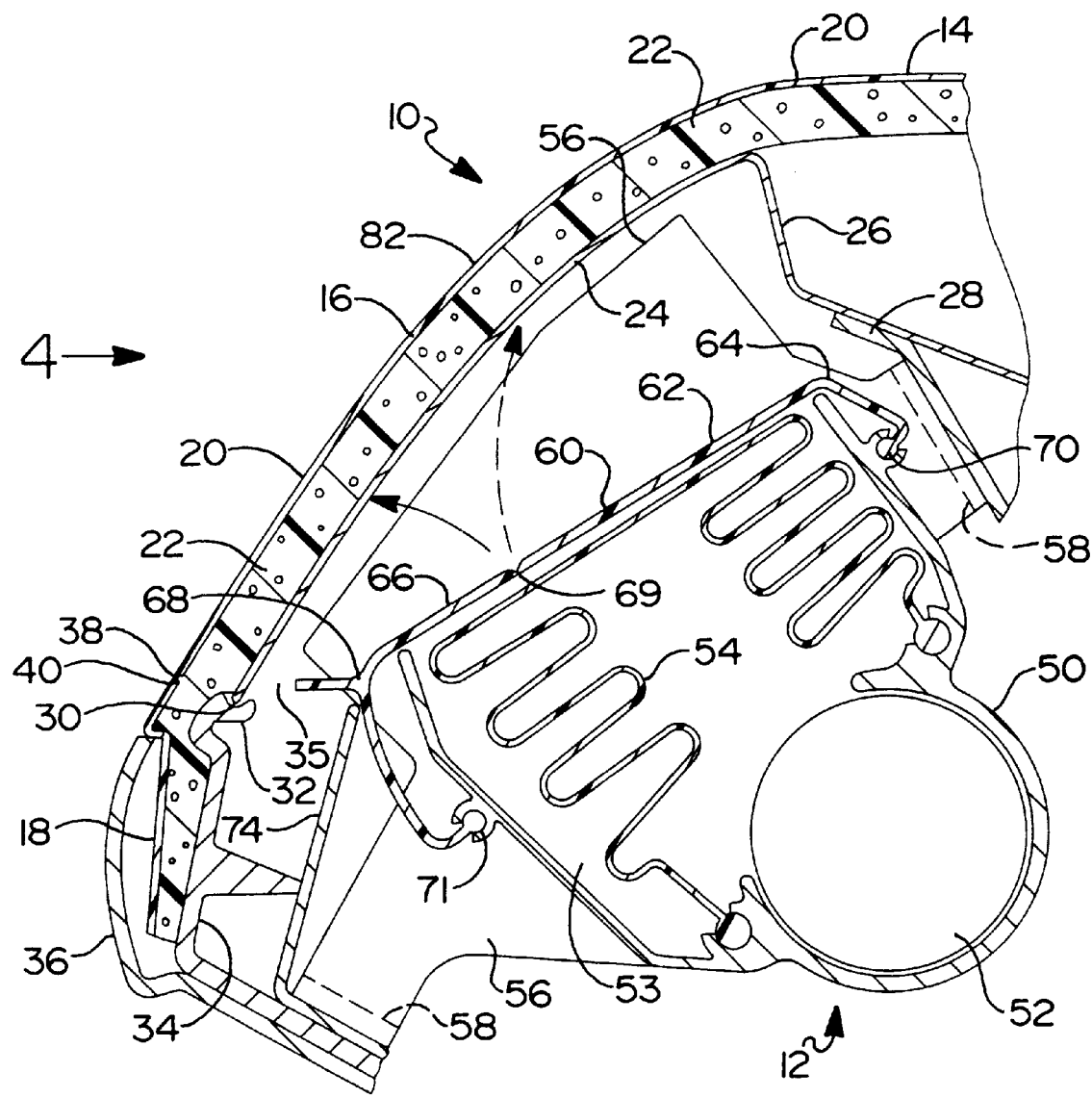
FIG. 1 is a transverse sectional view taken through one embodiment of the invention, with the airbag in an inactive, non-deployed, condition.

Referring to FIG. 1, there is shown a vehicle safety airbag installation embodying the invention. The airbag installation is intended for deployment on the passenger side of the vehicle, not the driver side.

The airbag installation includes an instrument panel 10 and an airbag assembly 12 concealed by the instrument panel. Instrument panel 10 includes an upper shelf portion 14, an intermediate angular portion 16, and a reinforced lower portion 18. The space located below the instrument panel is normally occupied by a glove compartment, not shown. In FIG. 1 the vehicle windshield is located to the right of the instrument panel. The passenger space is located to the left of the instrument panel.

Instrument panel 10 includes a plastic skin 20, resilient foam core 22, and an inner flexible wall 24. Wall 24 is preferably formed of sheet steel. Resilient foam core 22 is adhesively bonded to skin 20 and flexible wall 24. Wall 24 includes an upper portion 26 that turns downwardly away from foam core 22 for attachment to an internal support bracket 28. Wall 24 has a lower front edge 30 that seats in a trough structure 32 formed on a retainer 34 that extends horizontally along the lower edge area of foam core 22. The foam core is preferably bonded to retainer 34. A decorative trim strip 36 can be attached to retainer 34 to conceal the lower edge of foam core 22.

As an important feature of the invention, the internal surface of plastic skin 20 has a notch 38 extending therealong. FIG. 1 shows the notch in cross section. FIG. 4 shows the planar configuration of the notch. As depicted in FIG. 4, the notch has a U-shaped configuration, that includes a horizontal notch segment 40 extending along the lower portion of the instrument panel, and two upwardly extending notch segments 42 extending upwardly from notch segments 40. Notch segments 42 terminate at, or near, the point where the instrument panel begins to ran horizontally, as at 14 in FIG. 1.

Figure 2:
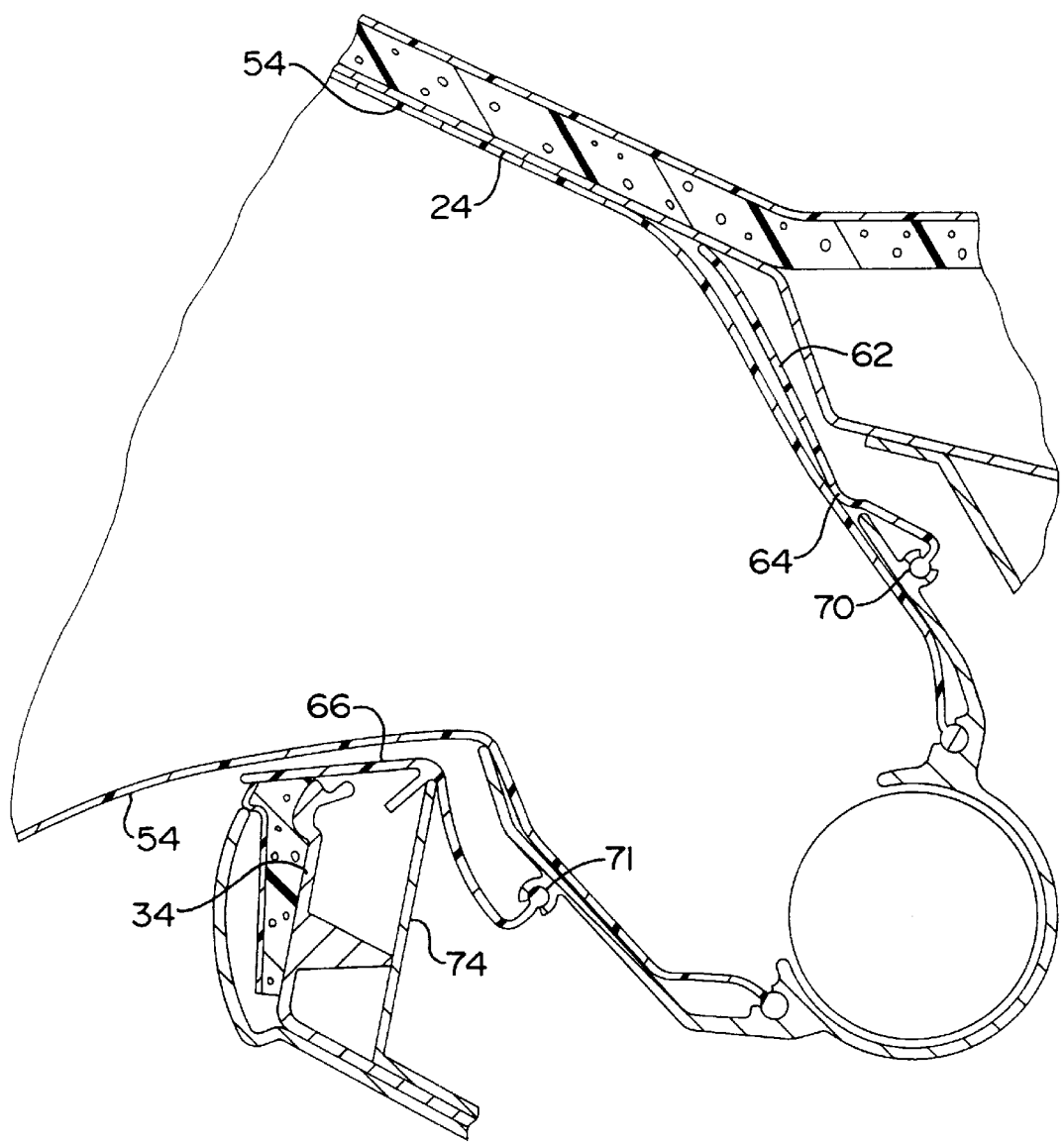
FIG. 2 is a transverse sectional view, taken in the same direction as FIG. 1, but showing the airbag in an expanded (deployed) condition.

Flexible wall 24 has a lower edge 30 aligned substantially with notch segments 40 of notch 38, and two side edges 44 aligned substantially with notch segments 42 of the notch 38. Should skin 20 be severed along the notch 38 seam, the area of panel 16 circumscribed by notch 38 will form a hinged flap having a hinge axis located on area 26 of flexible wall 24. FIG. 2 shows the flap swung upwardly to a position permitting a safety airbag to expand through the opening formed by the flap into the passenger compartment (to the left of the instrument panel). Foam core 22 is relatively fragile, such as to offer only minimal resistance to formation of the hinged flap.

The single hinged flap is devoid of slots or weakened points in surface area 82 (FIG. 1) where a passenger might likely strike the panel. Retainer 34 is located below passenger impact area 82, such that area 82 can be optimized for cushioning performance.

Airbag assembly 12 comprises a rigid canister 50 that includes a cylindrical chamber 52 containing a gas generator (not shown), and a second chamber 53 containing a folded airbag 54. When the gas generator is activated (by electrical ignition of a chemical gas-generating composition) the airbag is expanded to the condition depicted generally in FIG. 2.

Canister 50 includes two end plates 56 having ears 58 for attaching the canister to support structures 28 and 34. The end plates confine the expanding airbag against undesired lateral expansion. The spacing of end plates 56 is slightly less than the spacing between side edges 44 of flexible wall 24 that define the side edges of the hinged flap.

Canister 50 has an airbag exit mouth registering with the flap formed by the U-shaped notch 38. A hinged closure means 60 normally closes the exit mouth so as to prevent inadvertent escape of the folded airbag out of chamber 53. Closure means 60 comprises an upper lid 62 having a hinged connection 70 with the canister, and a lower lid 66 having a hinged connection 71 with the canister. The free edges of lids 62 and 66 are joined together by a severable connection 69 that may be a notch or a series of perforations.

When the gas generator produces a high gas pressure within the airbag (typically sixty to one hundred p.s.i.) the airbag presses against lids 62 and 66 so as to sever the scored connection 69 between the lids. The lids swing outwardly around the respective hinge connections 70 and 71, to forcibly strike wall 24. This action severs skin 20 and foam core 22 along the seam formed by U-shaped notch 38. The hinged flap formed by this severing action swings upwardly to the FIG. 2 condition, permitting the airbag to expand into the passenger compartment.

The closure means 60 for the canister exit mouth is initially installed on the canister by means of the hinge connections 70 and 71. Each hinge connection includes a cylindrical enlargement having a swivel fit in a mating socket formed on the canister wall.

During the initial stage of lid movement from the closed condition, each cylindrical enlargement will swivel slightly in the associated socket. However, the lids are prevented from unlimited swinging motion by structures in the lid movement paths. Lid 62 contacts wall 24, so that during the final stage of lid motion the lid swings in reverse fashion generally around a hinge 64 axis. Hinge axis 64 forms a living hinge. Lid 66 contacts the fixed stop structure 74 shortly after connection 69 is severed so that the lid flexes around the upper end of structure 74 from the FIG. 1 condition to the FIG. 2 condition. Hinge 68 is a living hinge. The use of living hinges 64 and 68 for lids 62 and 66 is believed to be advantageous in minimizing shock forces on the lid walls. The hinge structures are designed to preclude obstructions or gaps at the edges of the canister mouth that could interfere with airbag deployment while the lids swing to the FIG. 2 open condition.

It will be seen from FIG. 2 that when lid 66 is in the open position the lid extends across the upper edge of panel retainer 34 and trim strip 36. The lid thus acts as a guide for the airbag, to prevent the airbag from expanding into the gap 35 alongside retainer 34. Retainer 34 and stop structure 74 provide support for the lid 66 and the associated lower wall of the canister (to prevent outward ballooning of the canister lower wall). If gap 35 were not closed by lid 66, the airbag could expand into the gap and cause damage to the panel retainer 34. In some cases, the panel retainer could actually splinter causing potential injury.

By closing gap 35 with lid 66, the panel retainer 34 is cushioned from the force of the deploying airbag. This allows the panel retainer 34 to be constructed with a more compliant energy absorbing structure such that rigidifying and strengthening ribs on the panel reinforcement may be reduced or eliminated. This, in turn, provides a safer and softer surface to a passenger in the event of low energy impacts, which do not cause airbag deployment. In this case, if the passenger impacts the trim strip 36 and retainer 34, a softer and safer impact results.

With the particular canister disposition depicted in FIG. 1, upper lid 62 has a length dimension (from its hinge axis 64 to severable connection 69) that is substantially greater than the corresponding length dimension of lower lid 66. This is necessary in order to prevent lid 66 from having excessive area clamped under pressure to the flap wall 24, which may pull the lower lid 66 off, compromising its function described above.

Figure 3:
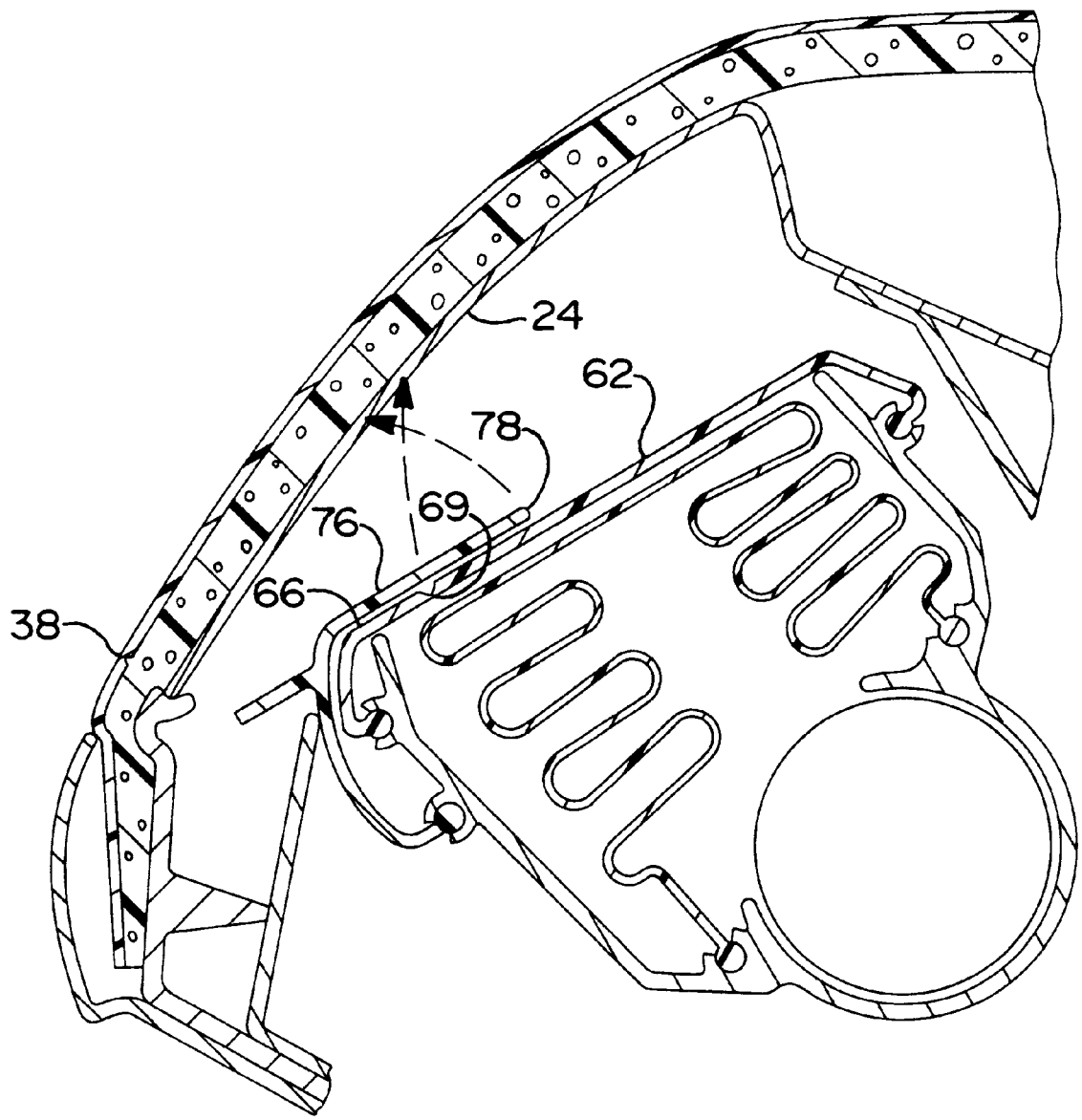
FIG. 3 is a transverse sectional view taken in the same direction as FIG. 1, but showing a second embodiment of the invention.

In some installations where the airbag canister might be spaced from the instrument panel by a relatively great distance, the lid construction of FIG. 1 might not permit lower lid 66 to be long enough to protect members 34 and 36 from airbag 54, and still be short enough to not have excessive area clamped to wall 24 described above. FIG. 3 shows an alternate arrangement that provides a short lower lid 66 with a separate extension flap 76 that overlies lid 66 to provide the protection described.

Lid 66 in the FIG. 3 construction is shortened in proportion to the lengthening of lid 62. To augment the effective length of lid 66, the lid is equipped with an auxiliary swingable extension arm 76 that overlies lid 66. As shown in FIG. 3, arm 76 has a free edge 78 that extends beyond severable connection 69 into overlapment with lid 62. Extension arm 76 extends the effective length of lid 66 without extending the length of lid 66 itself creating the excessive clamped area that would compromise its function.

FIG. 5 shows another way of extending the free edge of lid 66 without unduly lengthening lid 66. As shown in FIG. 5, lid 66 has an extension arm 82 secured to its upper surface, such that arm 82 overlies lid 62 when the lids are closed. Extension arm 82 effectively extends the length of lid 66, while keeping the portion below connection 69 short.

An important feature of the invention is that the instrument panel is constructed to form a single hinged flap, via the U-shaped notch 38. The single flap is rigidified by the retainer 34 located along the flap lower edge. At the same time, the upper portion 82 of the flap is relatively resilient so as to be capable of absorbing low level impacts, e.g. should a person strike his head on the skin 22 surface without deployment of the airbag.

Another feature of the invention is that lids 62 and 66 are spaced from the internal surface of the instrument panel, such that the airbag assembly does not interfere with the cushioning action of the padded instrument panel. At the same time the lids 62 and 66 are close enough to the instrument panel to facilitate airbag deployment in a crash situation. Lids 62 and 66 act as guides for the airbag while the airbag is expanding out of the canister into the passenger compartment. As shown in FIG. 2, lower lid 66 spans the gap 35 between the airbag canister and retainer bar 34, to prelude undesired expansion of the airbag into the gap behind retainer 34.

What is claimed:

1. In combination, an automotive instrument panel and an airbag assembly concealed by said panel;

said panel comprising an outer skin (20), an inner flexible wall (24), and a foam core bonded to said outer skin and said inner wall; said inner flexible wall having a lower edge (30), said outer skin and foam core extending downwardly below the lower edge of the flexible inner wall;

a concealed stationary panel retainer (34) located behind said panel below the lower edge of said inner flexible wall, said retainer having an upper edge (at 32) extending along the lower edge of said flexible wall and a front surface affixed to the foam core;

said outer skin having a U-shaped notch (38) extending therealong to form a tearable seam; said U-shaped notch including a horizontal notch segment (40) aligned with the lower edge of said flexible inner wall, and two upwardly-extending notch segments (42) connected to said horizontal notch segment;

said inner flexible wall having two side edges (44) aligned with said upwardly-extending notch segments, so that when the skin is severed along the tearable seam a single upwardly movable hinged flap is formed in said panel;

said airbag assembly comprising an airbag canister having an airbag exit mouth registering with said flap, a hinged closure means extending across said exit mouth in spaced relation to said flap, and an expandable airbag disposed within said canister whereby airbag expansion causes said closure means to forcibly strike said flexible wall, so as to produce upward movement of said flap;

said closure means comprising an upper hinged lid and a lower hinged lid; said lower hinged lip having a sufficient length to extend forwardly beyond said panel retainer when said lower lid is swung away from the airbag exit mouth.

2. The combination of claim 1, wherein said lower lid comprises an extension arm overlapping a portion of said upper lid when the hinged closure means is in a closed position extending across the exit mouth of the canister.

3. The combination of claim 1, and further comprising a severable connection normally joining said upper and lower lids; each lid having a swivel connection to said canister and a living hinge that is activated only after the severable connection has been broken.

* * * * *